United States Patent [19]

Carpenter

[11] Patent Number: 5,240,629
[45] Date of Patent: Aug. 31, 1993

[54] REFRIGERANT COMPOSITIONS
[75] Inventor: Joel F. Carpenter, Baton Rouge, La.
[73] Assignee: Ethyl Corporation, Richmond, Va.
[21] Appl. No.: 819,073
[22] Filed: Jan. 10, 1992
[51] Int. Cl.$^5$ ............................................... C10M 5/00
[52] U.S. Cl. ................................. 252/68; 252/56 R; 252/565
[58] Field of Search ......................... 252/68, 56 R, 565
[56] References Cited

U.S. PATENT DOCUMENTS

| | | | |
|---|---|---|---|
| 3,719,600 | 3/1973 | Bosniak et al. | 252/5655 A |
| 4,208,293 | 6/1980 | Zaweski | 252/51.5 A |
| 4,267,064 | 5/1981 | Sasaki et al. | 252/52 A |
| 4,428,854 | 1/1984 | Enjo et al. | 252/69 |
| 4,439,336 | 3/1984 | Zaweski | 252/32.7 E |
| 4,463,641 | 3/1984 | Stel et al. | 252/68 |
| 4,755,316 | 7/1988 | Magid et al. | 252/68 |
| 4,851,144 | 7/1989 | McGraw et al. | 252/565 |
| 4,944,890 | 7/1990 | Deeb et al. | 252/54 |
| 4,948,525 | 8/1990 | Sasaki et al. | 252/52 A |
| 4,992,188 | 2/1991 | Jolley | 252/51.5 A |
| 5,053,155 | 10/1991 | Mahier | 252/68 |

FOREIGN PATENT DOCUMENTS

| | | |
|---|---|---|
| 0089709 | 3/1983 | European Pat. Off. |
| 1-73195 | 7/1990 | Japan |
| 1508349 | 11/1975 | United Kingdom |
| 2216541 | 10/1989 | United Kingdom |
| 90/06979 | 6/1990 | World Int. Prop. O. |

OTHER PUBLICATIONS

Skarzewski, Jacek, "The Michael Reaction of Methanetricarboxylic Esters. A Simple Method for Two-Carbon Chain Elongation." *Synthesis*, Dec. 1990, pp. 1125-1127.
Sanvordenker, K. S., "Materials Compatibility of R134a in Refrigerant Systems." ASHRAE Winter Meeting, Jan. 1989; pp. 211-216.
Jolley, S. T., "New and Unique Lubricants for Use in Compressors Utilizing R134a Refrigerant." ASHRAE Conference, Jul., 1990, pp. 145-151.

*Primary Examiner*—Paul Lieberman
*Assistant Examiner*—David A. Zarneke
*Attorney, Agent, or Firm*—David E. LaRose; Patricia J. Hogan

[57] ABSTRACT

This invention relates to a refrigerant composition comprising a major amount of refrigerant and a minor amount of at least one ester of an alkane polycarboxylic acid said polycarboxylic acid having more than two carboxyl groups.

11 Claims, No Drawings

REFRIGERANT COMPOSITIONS

BACKGROUND

This invention relates to compositions for refrigeration systems. More particularly, the compositions contain one or a mixture of esters of alkane polycarboxylic acid esters which are useful as synthetic lubricants in compositions containing fluorine-containing hydrocarbons.

Chlorofluorocarbons, generally referred to in the industry as CFCs, have been widely used in refrigeration systems. The use of CFCs has been diminishing in recent years because of the detrimental effect on the earth's ozone layer that CFCs are believed to cause. Finding a safe, efficient replacement for CFC's has been a problem which is difficult to solve. Several replacement candidates have been suggested as alternatives to the fully halogenated hydrocarbons. Examples of alternatives include halogenated hydrocarbons containing at least one hydrogen atom such as HCFC-22 which is difluorochloromethane, HCFC-123 which is 1,1-dichloro-2,2,2-trifluoroethane, HFC-134a which is 1,1,1,2-tetrafluoroethane, and HCFC-141b which is 1,1-dichloro-1-fluoroethane. Of the foregoing, HCFC-22 and HFC-134a are generally recommended as being candidates in refrigerant applications, with HFC-134a being particularly attractive because its ozone depletion potential is believed to be zero and its thermodynamic properties are similar to those of CFC 12 (dichlorodifluoromethane).

One problem with using alternative refrigerant materials is that the alternative materials have different solubility characteristics than the CFCs used in refrigerants presently. For example, the mineral lubricating oil is incompatible (i.e., insoluble) in HFC-134a. Such incompatibility can result in unacceptable compressor life in compressor type refrigeration equipment including commercial, home and industrial refrigerators and air-conditioners for auto, home, and industrial use.

Numerous refrigeration lubrication oils have been proposed for use with HFC-134a; however, such oils have advantages and disadvantages when taking into account the following typical properties required in service:

(1) Optimum viscosity
(2) Good low temperature characteristics including low pour point and low floc point.
(3) Low critical temperature for dissolution in refrigerants.
(4) Good data on sealed-tube tests; that is, no discoloration, no precipitation and no copper plating.
(5) Good thermal and chemical stability even in the presence of halogen-containing refrigerants.

In addition to the foregoing criteria for the value of refrigeration lubricants, there is another important factor which must be considered, particularly where the lubrication oil is intended to be used in refrigerators operating on a compressor system. It is the capability of a given oil to establish a gas seal between the low pressure side (suction) and the high pressure side (discharge) of the compressor. Modern refrigeration compressors have a tendency to encounter increased gas temperatures at the discharge side, which would lead to reduced oil viscosity and hence to loss in the sealability.

A recent paper by K. S. Sanvordenker, "Materials Compatibility of HFC-134a in Refrigerant Systems", pps. 211-216 (presented at the ASHRE Winter Meeting in January 1989) discusses several proposed refrigerant lubricants One proposed lubricant is a polyglycol lubricant, e.g., polypropylene glycol monoether, polyethylene-propylene glycol monoether, etc. Polyoxyalkylene glycol monoethers are disclosed as refrigerant lubricants in U.S. Pat. Nos. 4,267,064, 4,755,316, and 4,948,525. The miscibilities of polyglycols with HFC-134a indicate that the immiscibility region is at high temperatures. U.S. 4,851,144 relates to the use of a polyether polyol as a lubricant in a composition with HFC-134a refrigerant. Another proposed lubricant is a dibasic acid ester or a neopentyl ester.

Polyalkylene glycols, esters, and amides all appear to be useful as lubricants according to Scott T. Jolley's paper, "New and Unique Lubricants for Use in Compressors Utilizing R-134a Refrigerant", pps. 145-152 (given at the ASHRE/Refrigeration/Compressor Engineering Conference at Purdue, July 1990). This paper observes that of the three, ester-type base fluids seem to offer the greatest number of advantages, followed by the polyalkyleneglycols and amides. Tertiary amides of the formula

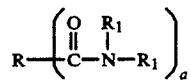

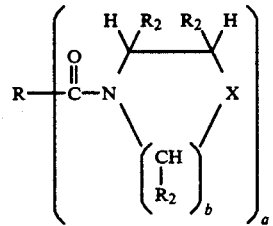

are disclosed in U.S. 4,992,188 as being suitable for use with HFC-134a refrigerants.

In WO 90/06979 (U.S. Ser. No. 284,315), a liquid composition is described which comprises: (A) a major amount of a fluorine containing hydrocarbon containing one or two carbon atoms, and (B) a minor amount of a soluble organic lubricant comprising at least one carboxylic ester compound characterized by the formula:

wherein R is a hydrocarbyl group of at least 2 carbon atoms; $R^1$ is a hydrocarbylene group; $R^2$ is H, hydrocarbyl, $-CF_3$, $-R^4CN$, $-R^4-NO_2$, $R^5OCH(R^6)-$; $R^3$ is a $-R^4CF_3$, $-R^4CN$ or $-R^4NO_2$ group; n is an integer from 1 to about 50; $R^4$ is a hydrocarbylene group; $R^5$ is H, a lower hydrocarbyl group or $R^7C(O)-$ where $R^7$ is a hydrocarbyl group; and $R^6$ is H or a lower hydrocarbyl group.

Japan Kokai 173,195 (1990) discloses a lubrication oil for a refrigeration compressor which compound is represented by the formula

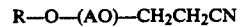

wherein R is selected from hydrocarbon groups containing 1-12 carbon atoms, cyanoethyl group, and a hydrogen atom; AO is an oxyalkylene group containing 2-18 carbon atoms; and n is an integer from 1-50.

U.S. 4,944,890 relates to the use of polymers of $R_f(CH_2)_nCH=CH_2$ where $R_f$ may be $CF_3$— to $C_{10}F_{21}$— or higher; and n=0-2 as lubricants in HFC-134a refrigeration systems. U.K. 1,508,349 discloses the use of hydrogenated polyalkylene compounds as lubricants for halogenated alkane refrigerants.

U.S. Pat. Nos. 4,208,293, and 4,439,336 relate to the use of fatty acid amides of diethanolamine, fatty acid esters of diethanolamine, and fatty acid ester-amides of diethanolamine in lubricant oil compositions.

While the foregoing are useful for some refrigerant lubrication needs, there continues to be a need for a synthetic lubricant which provides all of the advantages provided by the present invention.

THE INVENTION

In one embodiment, this invention provides, inter alia, a refrigerant composition comprising a major amount of refrigerant and a minor amount of at least one ester of alkane polycarboxylic acid, said polycarboxylic acid having more than two carboxyl groups. It has been found surprisingly, that such esters have unique properties when used as lubricants in refrigerant compositions.

In another embodiment, this invention provides a refrigerant composition comprising a major amount of refrigerant and a minor amount of a reaction product of (i) a polycarboxylic acid, anhydride, or halide and (ii) one or a mixture of hydrocarbyl alcohol(s) wherein said acid, anhydride, or halide contains more than two carboxyl groups.

In yet another embodiment, this invention provides a method of operating a refrigeration compressor comprising providing a refrigerant and an amount of a reaction product of (i) a polycarboxylic acid, anhydride, or halide and (ii) one or a mixture of hydrocarbyl alcohol(s), which amount is sufficient to provide lubrication to said refrigeration compressor during operation and wherein said acid, anhydride, or halide contains more than two carboxyl groups.

A wide variety of refrigerants may be used in the compositions and methods of this invention including brines, ammonia, hydrocarbons, and halogenated hydrocarbons. Brines include salts, e.g. calcium chloride, sodium chloride, and the like; glycols, e.g., ethylene and propylene glycol; and alcohols, e.g., methanol, ethanol, and the like. Hydrocarbons useful as refrigerants include butane, propane, propylene, ethane, ethylene, and methane. Of the halogenated hydrocarbons, the preferred are the fluorine-containing hydrocarbons. Particularly preferred are fluorine-containing hydrocarbons having at least one C-H bond as well as C-F bonds. Most preferably, the refrigerant is one or a mixture of tetrafluoroethanes, e.g., 1,1,1,2-tetrafluoroethane, hereinafter referred to as HFC-134a. The compositions may also be used with other halogenated refrigerants such as difluorochloromethane (HCFC-22), 1,1-dichloro-2,2,2-trifluoroethane (HCFC-123), and 1,1-dichloro-1-fluoroethane (HCFC-141b). Such refrigerant compositions are suitable for home, automotive, and industrial refrigeration needs.

A key feature of the compositions and methods of this invention containing one or a mixture of ester(s) of alkane polycarboxylic acid as a lubricant is the mutual solubility of the refrigerant and the lubricant over the entire range of temperature, pressure, and composition to which the refrigerant composition is exposed. A suitable refrigeration lubricant therefore should be completely miscible at a temperature ranging from about −40° C. to about 70° C. or higher. Solubility helps to ensure that the lubricant is supplied to bearing and enhances oil return from the refrigeration system. The degree of solubility depends on the composition of the lubricant, including type of hydrocarbon, molecular weight, and molecular weight distribution. Hence, an acceptable lubricant should meet the boundary lubrication requirements as evaluated by the extreme pressure lubrication test according to ASTM D 3233-73.

The viscosity of the lubricant is another factor to consider when selecting an appropriate refrigerant lubricant. The viscosity should not be so high at low temperatures that the flow of refrigerant containing the lubricant is impeded, nor should the viscosity be so low at high temperatures that the lubricity of the refrigerant and lubricant decreases. A suitable viscosity for a refrigerant lubricant ranges from about 1 to about 200 centistokes (cSt) at 40° C. and about 0.5 to about 100 cSt at 100° C., preferably from about 5 to about 30 cSt at 40° C. and about 2 to about 20 Cst at 100° C., and most preferably from about 10 to about 20 Cst at 40° C. and about 2 to about 5 Cst at 100° C.

Refrigerant lubricant of this invention is one or a mixture of compounds formed by reacting an alkane polycarboxylic acid, anhydride, or halide with one or a mixture of hydrocarbyl alcohols in the presence of a catalytic amount of an esterification catalyst. The alkane polycarboxylic acid reactant preferably contains more than 2 carboxyl groups and an alkane backbone having at least 3 carbon atoms. Thus useful polycarboxylic acids are 1,2,3-propane tricarboxylic acid; 1,1,2-propane tricarboxylic acid; 1,2,2-propane tricarboxylic acid; 1,2,3,4-butane tetracarboxylic acid; 1,2,3-butane tricarboxylic acid; 1,2,2,4-butane tetracarboxylic acid; 1,2,3,4,5-pentane pentacarboxylic acid; 1,2,3,4,5,6-hexane hexacarboxylic acid; the anhydride, bromide, or chloride homologs of one or more of the foregoing; and the like. The alkane backbone portion of the carboxylic acid may contain from 3 to 10 carbon atoms or more provided the esterified product is soluble in the refrigerant. Particularly preferred are the butane polycarboxylic acids, anhydrides, and chlorides, most preferably 1,2,3,4-butane tetracarboxylic acid, anhydride, or chloride.

To form the esters useful in the compositions and methods of this invention, a polycarboxylic acid, anhydride, or halide is reacted with a hydrocarbyl alcohol or a mixture of hydrocarbyl alcohols usually in the presence of a catalytic amount of an esterification catalyst. Removal of water by azeotropic distillation subsequent to the reaction tends to drive the reaction to completion.

For the purposes of this invention, a wide variety of hydrocarbyl alcohols may be used to esterify the polycarboxylic acid reactant. Such alcohols include alkyl, aryl, cycloalkyl, aralkyl, alkaryl, cycloalkylalkyl, cycloalkylaryl, haloalkyl, halocycloalkyl, haloaryl, and the like alcohols having from 1 to about 20 carbon atoms. Preferred are the alkyl or cycloalkyl alcohols having from 1-20 carbon atoms, most preferably alkyl alcohols having from 1-10 carbon atoms. Mixture of alcohols may also be used for the esterification reaction step.

The ratio of hydrocarbyl alcohol to polycarboxylic acid in the reaction mass typically ranges from about 0.5 to about 10 moles per mole equivalent of polycarboxylic acid, more preferably about 1 to about 6 moles per mole equivalent, and most preferably about 2 moles to about 5 moles per mole equivalent of polycarboxylic acid. By mole equivalent is meant the number of moles of polycarboxylic acid multiplied by the number of carboxyl groups per acid molecule.

Desirably, the esterification reaction is conducted in the presence of an esterification catalyst, such as p-toluenesulfonic acid, methanesulfonic acid and the like. The esterification of the acid with a hydrocarbyl alcohol yields a quantity of water as one of the products of the reaction. Water can be removed, thus further driving the reaction to completion by well known distillation techniques. The catalyst may then be removed by washing the product with a basic solution. Once separated from the reaction mass, the product can then be blended with a refrigerant to form the refrigerant compositions of this invention.

Refrigerant compositions, according to this invention, typically contain a major amount of refrigerant and a minor amount of a reaction product of (i) a polycarboxylic acid, anhydride, or halide and (ii) one or a mixture of hydrocarbyl alcohol(s) wherein said acid, anhydride, or halide contains more than two carboxyl groups. By minor amount is meant there is less than one (1) part of reaction product per part of refrigerant. Preferably, the refrigerant contains from about 0.001 part to about 0.7 part of reaction product per part of refrigerant, and most preferably from about 0.1 part to about 0.5 part of reaction product per part of refrigerant. Blends of the refrigerant and lubricant can be made with commercially available equipment by well known means. While the above lubricant compositions are generally formed before use in the refrigeration equipment, it is to be understood that such compositions may also be formed in situ during operation of the refrigeration equipment. Thus, each component may be charged to the refrigeration equipment separately, in any order, or, if desired, essentially simultaneously without first blending the refrigerant and the lubricant.

The following examples illustrate, but are not intended to limit, embodiments of the present invention.

EXAMPLE 1

Preparation of 1,2,3,4-butane-tetra-(butylcarboxylate)

A 100 mL flask equipped with a condenser was charged with 1,2,3,4-butane tetracarboxylic acid (5.51 grams, 23.6 mmol), p-toluenesulfonic acid (0.61 gram, 3.2 mmol), and butanol (35 grams, 470 mmol). The mixture was heated to 120° C. in a hot oil bath and held at this temperature for 20 hours. Water formed from the reaction along with excess reagent were removed by simple distillation of the reaction mass. The bottoms product remaining after distillation was diluted with 50 mL of ethyl acetate then washed with two 30 mL portions of 3 wt. % aqueous sodium bicarbonate then brine. The washed product was filtered through cotton and the solvent was stripped from the product under reduced pressure. A light yellow oil weighing 10.8 grams of 1,2,3,4-butane-tetra-(butyl carboxylate) was recovered for a 99 wt. % yield based on theoretical. The recovered product was totally miscible in R134a, and had a viscosity at 40° C. of 20.3 Cst, and a viscosity at 100° C. of 3.77 and a viscosity index of 50.

EXAMPLE 2

Preparation of 1,2,3,4-butane-tetra-(ethyl carboxylate)

In a 100 mL flask equipped with a condenser, 1,2,3,4-butane tetracarboxylic acid (8.0 grams, 34.2 mmol) was condensed with ethanol (100 grams, 217 mmol) in the presence of methanesulfonic acid (0.55 gram, 5.8 mmol) generally in accordance with the procedure of Example 1. The recovered product contained 7.4 grams of 1,2,3,4-butane-tetra-(ethyl carboxylate) for a 62 wt. % yield based on theoretical. The recovered product Was totally miscible in R134a, and had a viscosity at 40° C. of 30.0 Cst, and a viscosity at 100° C. of 3.59.

EXAMPLE 3

Preparation of 1,2,3,4-butane-tetra-(butyl/isopropyl carboxylate)

In a 100 mL flask equipped with a condenser, 1,2,3,4-butane tetracarboxylic acid (6.87 grams, 29.4 mmol) was condensed with a mixture of n-butanol (20 grams, 270 mmol) and isopropanol (16.2 grams, 270 mmol) in the presence of p-toluenesulfonic acid (0.64 gram, 3.4 mmol) generally in accordance with the procedure of Example 1. A yellow oil containing 13.2 grams of 1,2,3,4-butane-tetra-(butyl/isopropyl carboxylate) was recovered wherein the butyl to isopropyl ester ratio was 10.3:1. The recovered product was 99 wt. % based on theoretical. The recovered product was totally miscible in R134a, and had a viscosity at 40° C. of 21.1 Cst, and a viscosity at 100° C. of 3.83 and a viscosity index of 45.

Refrigerant compositions of this invention can additionally comprise additives known and typically used in the refrigeration arts. The additives which may be included in the liquid composition of the present invention to enhance the performance of the liquids include extreme-pressure and anti-wear agents, oxidation and thermal-stability improvers, corrosion-inhibitors, viscosity-index improvers, pour point and/or floc point depressants, detergents, dispersants, anti-foaming agents, viscosity adjusters, etc. Included among the materials which may be used as extreme-pressure and anti-wear agents are phosphates, phosphate esters, phosphites, thiophosphates such as zinc diorganodithiophosphates, dithiocarbamates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Sterically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic phosphates, organic alcohols, metal sulfonates, organic phosphites, etc. VI improvers include polyolefins such as polyesterbutene, polymethacrylate, polyalkyl styrenes, etc. Pour point and floc point depressants include polymethacrylates, ethylene-vinyl acetate copolymers, succinamic acid-olefin copolymers, ethylenealpha olefin copolymers, etc. Detergents include sulfonates, long-chain alkyl-substituted aromatic sulfonic acids, phosphonates, phenylates, metal salts of alkyl phenols, alkyl phenol-aldehyde condensation products, metal salts of substituted salicylates, etc. Silicone polymers are a well known type of anti-foam agent. Viscosity adjusters are exemplified by polyisobutylene, polymethacrylates, polyalkyl styrenes, naphthenic oils, alkyl benzene oils, polyesters, polyvinyl chloride, polyphosphates, etc. Such additives include, among others, thermal resistance improvers (e.g., alkylene oxides), loadcarrying additives (e.g., phosphorous acid esters) and stabilizers (e.g., phosphate esters, epoxy compounds, organotin compounds).

The liquid compositions of the present invention are particularly useful as refrigerants in various refrigeration systems which are compression-type systems such as refrigerators, freezers, and air-conditioners including automotive, home and industrial air-conditioners.

What is claimed is:

1. A refrigeration composition comprising one part by weight of a refrigerant and about 0.001–0.7 part by weight of at least one tetraalkyl ester of 1,2,3,4-butanetetracarboxylic acid as a lubricant.

2. The composition of claim 1 wherein the tetraalkyl ester is a tetra($C_1$–$C_{10}$)alkyl ester in which each of the alkyls is the same.

3. The composition of claim 2 wherein the tetraalkyl ester is the tetrabutyl ester.

4. The composition of claim 2 wherein the tetraalkyl ester is the tetraethyl ester.

5. The composition of claim 1 wherein the tetraalkyl ester is a tetra($C_1$–$C_{10}$)alkyl ester in which at least two of the alkyls are different.

6. The composition of claim 5 wherein the alkyls are butyl and isopropyl.

7. The composition of claim 1 wherein the refrigerant is a tetrafluoroethane.

8. The composition of claim 7 wherein the tetrafluoroethane is 1,1,1,2-tetrafluoroethane.

9. The composition of claim 1 comprising one part by weight of the refrigerant and about 0.1–0.5 parts by weight of the lubricant.

10. The composition of claim 9 wherein the refrigerant is 1,1,1,2-tetrafluoroethane and the tetraalkyl ester is a tetra($C_1$–$C_{10}$)alkyl ester in which the alkyls are the same or different.

11. A refrigeration compressor-operating method which comprises providing a refrigerant and, as a lubricant, an amount of at least one tetraalkyl ester of 1,2,3,4-butanetetracarboxylic acid sufficient to provide lubrication to the refrigeration compressor during operation, the amount of the lubricant being in the range of about 0.001–0.7 part per part of the refrigerant.

* * * * *